United States Patent [19]

Cavalla et al.

[11] 3,919,242

[45] Nov. 11, 1975

[54] 1-(BENZODIOXANYLALKYL) PIPERIDINES

[75] Inventors: John Frederick Cavalla, Isleworth; John Leheup Archibald, Windsor, both of England

[73] Assignee: John Wyeth & Brother Limited, Maidenhead, England

[22] Filed: Nov. 15, 1974

[21] Appl. No.: 524,006

Related U.S. Application Data

[60] Division of Ser. No. 323,684, Jan. 15, 1973, which is a continuation-in-part of Ser. No. 175,345, Aug. 26, 1971, abandoned.

[30] Foreign Application Priority Data

Sept. 3, 1970 United Kingdom............. 42090/70

[52] U.S. Cl.................. 260/293.58; 260/293.77; 260/295 AM; 260/295 Q; 260/340.3; 424/267
[51] Int. Cl.²............................. C07D 211/58
[58] Field of Search.................. 260/293.58

[56] References Cited
UNITED STATES PATENTS 3,821,234  6/1974  Koppe et al ............. 260/293.58

FOREIGN PATENTS OR APPLICATIONS 296,841  5/1965  Netherlands............. 260/293.58

OTHER PUBLICATIONS

Chemical Abstracts, 77:34,355z, (1972), Archibald et al.

Chemical Abstracts, 79:136,989t, (1973), Archibald.

*Primary Examiner*—Sherman D. Winters

[57] ABSTRACT

A group of benzodioxanyl compounds useful in the treatment of disorders and diseases of the cardiovascular system and/or in the treatment of superficial and deep allergic phenomena is described. These are piperidine compounds linked by the nitrogen atom to a substituted or unsubstituted benzo-1,4-dioxanyl radical through the intermediary of a lower-alkylene radical. The piperidine ring is further substituted by an acylamino residue.

2 Claims, No Drawings

1-(BENZODIOXANYLALKYL)PIPERIDINES

This invention relates to novel benzodioxanyl compounds and is a continuation-in-part of our copending application Ser. No. 323,684 filed Jan. 15, 1973, now abandoned, which is a continuation-in-part of our application Ser. No. 175,345 filed Aug. 26, 1971 entitled "Pharmaceutical Compositions" and now abandoned.

The invention provides a heterocyclic compound of the general formula

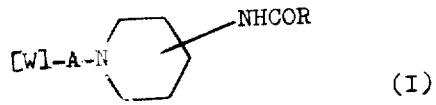

in which W represents benzo-1,4-dioxan-2-yl the benzo portion of which may be substituted by lower alkoxy, halogen, nitro, hydroxy or lower alkyl, A represents a lower alkylene radical of 1 to 4 carbon atoms, and R represents phenyl which may be substituted by halogen, lower alkoxy or lower alkyl and the pharmaceutically acceptable acid addition salts thereof.

It is to be understood that the term "alkylene" used herein includes both straight and branched chain radicals.

The compounds of formula (I) and the pharmaceutically acceptable acid addition salts thereof exhibit pharmacological activity for example one or more of the following activities: action on the cardiovascular system (such as hypotensive and/or anti-hypertensive and/or peripheral vasodilation and/or anti-anginal and/or anti-arrhythmic activity), and anti-inflammatory activity when tested on warm-blooded animals.

In addition to having useful pharmaceutical properties as mentioned above the novel compounds of the invention are intermediates for the preparation of other compounds of formula I.

The benzo portion of the group W may be substituted by one or more groups, which may be the same or different selected from halogen (for example fluorine, chlorine or bromine), lower alkyl (for example methyl, ethyl, propyl, or n, s- and t-butyl), lower alkoxy (for example methoxy, ethoxy, propoxy or butoxy), nitro, and hydroxyl. Examples of A are methylene, ethylene, propylene, methylethylene, butylene. Examples of R are unsubstituted phenyl radicals and phenyl radicals which may be substituted by the same substituents as those already described for the benzo portion of the radical W. Examples of acid addition salts are those formed from inorganic and organic acids in particular pharmaceutically acceptable acid addition salts such as the sulphate, hydrochloride, hydrobromide, hydroiodide, nitrate, phosphate, sulphonate (such as the methane-sulphonate and p-toluene-sulphonate), acetate, maleate, fumarate, tartrate and formate.

The compounds of general formula (I) can be prepared in a number of ways by building up the molecule from suitable starting materials in known manner. Such processes applied to the preparation of the novel compounds of formula (I) are included in the scope of the invention.

One method of preparation of compounds of general formula (I) comprises reacting a compound of the general formula

with an alkylating or acylating agent of the general formula $$[W]-A-Y \quad (IV)$$

where R, W and A have the meanings already defined and Y is a halogen atom or an equivalent replaceable atom or radical, for example an organic sulphonyl radical such as tosyl radical.

The compounds of general formula (IV) are known compounds or can be made following the methods known for preparing compounds of these types. The starting materials of general formula III can generally be made by acylating a corresponding amino compound of the general formula

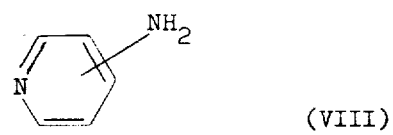

and reducing the ring system to the corresponding piperidine ring. The starting material of general formula III is preferably prepared by either (i) forming the oxime of an N-benzyl-4-piperidone, reducing to give the 4-amino compound acylating the amino group and then hydrogenolysing the benzyl residue, or (ii) treating the pyridine of formula

with a benzyl halide, for example benzyl chloride to give the quaternary salt, reducing with an alkali metal borohydride to give the corresponding N-benzyl-tetrahydro-pyridine which is further subjected to concomitant de-benzylation and reduction of the 3,4-double bond by catalytic hydrogenation, or (iii) catalytic hydrogenation of compound (IX) in the presence of acetic anhydride to give

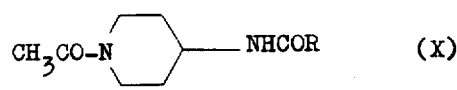

and then selectively hydrolysing the acetyl group.

A second general method of preparation of compounds of formula (I) comprises reacting a corresponding compound of formula (I) which contains a free amino group instead of the group NHCOR with either a reactive derivative of an acid of general formula R.COOH (where R is aryl, or cycloalkyl). As a reactive derivative of the acid of formula R.COOH used in the process described above, we have found it preferable usually to use a halide (for example the chloride or bromide) or an anhydride. Other examples of reactive derivatives of the acid R.COOH which may be used are the acid azide, mixed anhydrides and active esters. Furthermore, the compounds of formula (I) may also be prepared by treating a compound of formula (I) in which the NHCOR group is replaced by a free amino group with the acid R.COOH in the presence of a known condensing agent (for example, a carbodiimide), or by first activating the amino function (for example, by forming the phosphazo derivative) and then reacting with the acid R.COOH. In connection with the introduction of the —COR group into a compound of formula (I) in which the NHCOR group is replaced by a free amino group reference may be made to "Chemistry of the Amino Acids" by Greenstein and Winitz (John Wiley and Sons, Inc., Publishers, 1961) at pages 782–883 and 943–1108.

A still further aspect of the invention is the provision of a process for the preparation of compounds of general formula (I) which consists of reacting a compound of the general formula

[W]—A—OH (XVI)

(in which W, and A have the meanings defined above) with a compound of formula III.

The reaction is preferably carried out in the presence of a catalyst, for example Raney Nickel. An organic solvent, which is inert under the reaction conditions, is usually used for example xylene, toluene or benzene. Preferably the reaction is carried out by heating the reactants under reflux in a water-immiscible organic solvent, for example xylene, and removing the water formed during the reaction by azeotropic distillation. If necessary, reactive substituent groups can be blocked during a reaction and released later.

When a compound of formula (I) is produced wherein the radical W has one or more methoxy substituents, demethylation to the corresponding hydroxyl compound may be brought about in known manner. Furthermore, if the radical W has a nitro substituent this may be reduced in known manner to the corresponding amino compound which in turn may be further acylated or alkylated.

Compounds of formula I in which A contains a branched chain alkylene radical possess an asymmetric carbon atom and are therefore capable of existing in optically active stereo isomeric forms. The optical isomers may be separated by standard resolution procedures. For instance the compounds contain a basic nitrogen atom and may generally be resolved by treatment with a suitable optically active acid. Optically active acids are described in the literature and suitable ones for the resolution of any particular compound are chosen by experiment.

If necessary, in any of the reactions hereinbefore described, reactive substituent groups may be blocked during a reaction and released at a later stage. As already indicated the novel piperidine compounds provided by the invention contain a basic nitrogen atom and thus can form acid addition salts with acids (particularly pharmaceutically acceptable acids) or quaternary ammonium salts, for example with alkyl halides or aralkyl halides (particularly methyl iodide or benzyl chloride or bromide). The acid addition salts may either be formed in situ during the hereinbefore described processes and isolated therefrom or a free base may be treated with the appropriate acid in the presence of a suitable solvent and then the salt isolated. The quaternary salts may be prepared by treating the free base with the appropriate halide in the presence or absence of a solvent.

The compounds of the invention may be used in pharmaceutical compositions which contain as active ingredients a compound of formula (I) as hereinbefore defined, which may be micronised. In addition to the active ingredient, said compositions also contain a non-toxic carrier. Any suitable carrier known in the art can be used to prepare the pharmaceutical compositions. In such a composition, the carrier may be a solid, liquid or mixture of a solid and a liquid. Solid form compositions include powders, tablets and capsules. A solid carrier can be one or more substances which may also act as flavouring agents, lubricants, solubilisers, suspending agents, binders, or tablet-disintegrating agents; it can also be encapsulating material. In powders the carrier is a finely divided solid which is in admixture with the finely divided active ingredient. In tablets the active ingredient is mixed with a carrier having the necessary binding properties in suitable proportions and compacted in the shape and size desired. The powders and tablets preferably contain from 5 to 99, preferably 10–80% of the active ingredient. Suitable solid carriers are magnesium carbonate, magnesium stearate, talc, sugar, lactose, pectin, dextrin, starch, gelatin, tragacanth, methyl cellulose, sodium carboxymethyl cellulose, a low melting wax, and cocoa butter. The term "composition" is intended to include the formulation of an active ingredient with encapsulating material as carrier to give a capsule in which the active ingredient (with or without other carriers) is surrounded by carrier, which is thus in association with it. Similarly cachets are included.

Sterile liquid form compositions include sterile solutions, suspensions, emulsions, syrups and elixirs. The active ingredient can be dissolved or suspended in a pharmaceutically acceptable sterile liquid carrier, such as sterile water, sterile organic solvent or a mixture of both. Preferably a liquid carrier is one suitable for parenteral injection. Where the active ingredient is sufficiently soluble it can be dissolved in normal saline as a carrier; if it is too insoluble for this it can often be dissolved in a suitable organic solvent, for instance aqueous glycol or polyethylene glycol solutions. Aqueous propylene glycol containing from 10 to 75% of the glycol by weight is generally suitable. In other instances compositions can be made by dispersing the finely-divided active ingredient in aqueous starch or sodium carboxymethyl cellulose solution, or in a suitable oil, for instance arachis oil. Liquid pharmaceutical compositions which are sterile solutions or suspensions can be utilised by intramuscular, intraperitoneal or subcutaneous injection. In many instances a compound is orally active and can be administered orally either in liquid or solid composition form.

Preferably the pharmaceutical composition is in unit dosage form. In such form, the composition is subdivided in unit doses containing appropriate quantities of the active ingredient; the unit dosage form can be a packaged composition, the package containing specific quantities of compositions, for example packeted powders or vials or ampoules. The unit dosage form can be a capsule, cachet or tablet itself, or it can be the appropriate number of any of these in package form. The quantity of active ingredient in a unit dose of composition may be varied or adjusted from 5 mg. or less to 500 or more, according to the particular need and the activity of the active ingredient. The invention also includes the compounds in the absence of carrier where the compounds are in unit dosage form.

The following non-limiting Examples illustrate the invention:

EXAMPLE 1

2-(4'-Benzamidopiperid-1-yl)methylbenzo-1,4-dioxan 2-(Bromomethyl)benzo-1,4-dioxan (4.58 g.) was mixed with a finely ground mixture of 4-benzamidopiperidine (4.08 g.) and anhydrous potassium carbonate (2.76 g.).

The resulting paste was heated at 100°C for 2 hours to give a hard solid. This was broken up, washed well with water and ether and dried to give the title compound. Recrystallization from ethanolic hydrogen chloride and ether gave the hydrochloride of the title compound (6.00 g.), m.p. 214.8°C. (Found: C, 64.7; H, 6.7; N, 7.15. $C_{21}H_{24}N_2O_3 \cdot HCl$ requires C, 64.85; H, 6.5; N, 7.2%).

The product had marked hypotensive activity and also possessed anti-inflammatory activity.

EXAMPLE 2

2-[2-(4-Benzamidopiperid-1-yl)ethyl]-6-methoxybenzo-1,4-dioxan 2-(2-Bromoethyl)-6-methoxybenzo-1,4-dioxan is reacted with 4-benzamidopiperidine in the manner of Example 1 to give the title compound as a hydrochloride.

EXAMPLE 3

2-[4-(4-Benzamidopiperid-1-yl)butyl-7-chlorobenzo-1,4-dioxan 2-(4-Bromobutyl)-7-chloro-1,4-dioxan is reacted with 4-benzamidopiperidine in the manner of Example 1 to give the title compound as a hydrochloride.

EXAMPLE 4

2-[4-(2-Chloro)benzamidopiperid-1-yl]methyl-5-nitrobenzo-1,4-dioxan 4-(2-Chloro)benzamidopiperidine is reacted with 2-(bromomethyl)-5-nitrobenzo-1,4-dioxan in the manner of Example 1 to give the title compound as a hydrochloride.

EXAMPLE 5

2-[4-(3-Methoxy)benzamidopiperid-1-yl]methyl-8-hydroxybenzo-1,4-dioxan 4-(3-Methoxy)benzamidopiperidine is reacted with 2-(bromomethyl)-8-hydroxy-1,4-benzodioxan in the manner of Example 1 to give the title compound as a hydrochloride.

EXAMPLE 6

2-[4-(4-Methyl)benzamidopiperid-1-yl]methylbenzo-1,4-dioxan 2-(Bromomethyl)benzo-1,4-dioxan is reacted with 4-(4-methyl)benzamidopiperidine in the manner of Example 1 to give the title compound as a hydrochloride.

Tests for action on the cardiovascular system were conducted according to one of the following procedures:

Hypotensive and/or Anti-Hypertensive activity

Method 1 (Rat)

Rats were anaesthetised with pentobarbitone sodium (60 mg/kg) and the jugular vein, trachea and carotid artery were cannulated. The test compound was given intravenously at 15 min. intervals (dose range 0.8–25.6 mg/kg cumulative) and blood pressure and heart rate were recorded via the carotid artery at 30 second and 15 minutes after administration. The production of a fall of 30 mm. mercury in diastolic pressure from control values was considered to be significant hypotensive activity. A decrease in heart rate of more than 30% from control values was considered to be significant bradycardia.

Method 1 (Cat)

Cats were anaesthetised with pentobarbitone sodium (30 mg/kg) and the cephalic vein, femoral and carotid arteries and trachea were cannulated. The carotid cannula was introduced into the left ventricle and the femoral cannula into the aorta. Blood pressure and heart rate were recorded from the aortic cannula and left ventricular pressure from the carotid cannula. The test compounds were administered intravenously (0.1–25.6 mg/kg).

Method 2 (hypertensive rats)

Male or female rats are rendered hypertensive by applying a figure of 8 ligature around one kidney and contralateral nephrectomy. Blood pressure stabilises at a hypertensive level after 6 weeks. Systolic pressure is measured indirectly using a Decker Caudal Plethysmograph. A control group of rats is run with each group treated with drug. Each group usually consists of six rats. Drugs are usually administered by the IP or oral routes. Pressures are read prior to drug administration and at two and 24 hours thereafter.

Activity in either method 1 (rats or cats) or method 2 was considered to indicate hypotensive activity.

We claim:

1. A heterocyclic compound of the formula

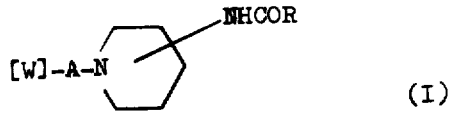

(I)

in which W represents benzo-1,4-dioxan-2-yl the benzo portion of which may be substituted by lower alkoxy, halogen, nitro, hydroxy or lower alkyl, A represents a lower alkylene radical of 1 to 4 carbon atoms, R represents phenyl which may be substituted by halogen, lower alkoxy or lower alkyl or a pharmaceutically acceptable acid addition salt thereof.

2. A compound as claimed in claim 1, which is selected from 2-(4'-benzamidopiperid-1-yl)methyl-benzo-1,4-dioxan and pharmaceutically acceptable acid addition salts thereof.

* * * * *